United States Patent

Ray et al.

[11] Patent Number: 6,118,946
[45] Date of Patent: Sep. 12, 2000

[54] METHOD AND APPARATUS FOR SCANNERLESS RANGE IMAGE CAPTURE USING PHOTOGRAPHIC FILM

[75] Inventors: Lawrence A. Ray; Timothy P. Mathers, both of Rochester, N.Y.

[73] Assignee: Eastman Kodak Company, Rochester, N.Y.

[21] Appl. No.: 09/342,370

[22] Filed: Jun. 29, 1999

[51] Int. Cl.$^7$ .............................. G03B 15/03; G03B 7/00; G03B 17/24; G06K 9/00

[52] U.S. Cl. ........................... 396/89; 396/155; 396/222; 396/311; 396/429; 356/3; 382/106

[58] Field of Search .............................. 396/89, 155, 222, 396/311, 310, 315, 429; 382/106; 356/3

[56] References Cited

U.S. PATENT DOCUMENTS

| | | | |
|---|---|---|---|
| 4,935,616 | 6/1990 | Scott | 356/5 X |
| 5,193,124 | 3/1993 | Subbarao | 396/89 X |

*Primary Examiner*—W. B. Perkey
*Attorney, Agent, or Firm*—Mark G. Bocchetti

[57] ABSTRACT

A method for image capture and estimation of range information is provided which uses photographic film as the image capture mechanism. A plurality of identical images are captured on film yielding an image bundle wherein each image in the image bundle is captured with a different phase offset. Fiducial marks are placed on the photographic film between adjacent images in the image bundle. The image bundle is developed and the developed images are scanned. The images of the image bundle are then registered by aligning the fiducial marks. The distance from the image capture device to object(s) in the images of the image bundle can then be estimated using the different phase offsets for each image. The range at a pixel location is estimated by selecting the intensity of the pixel at that location of each image and performing a best fit of a sine wave of one period through the points. The phase of the resulting best fitted sine wave is then used to estimate the range to the object based upon the wave length of the illumination frequency.

6 Claims, 8 Drawing Sheets

METHOD AND APPARATUS FOR SCANNERLESS RANGE IMAGE CAPTURE USING PHOTOGRAPHIC FILM

FIELD OF THE INVENTION

The present invention relates generally to three-dimensional image capture and, more particularly, to utilizing photographic film in conjunction with a scannerless range imaging system.

BACKGROUND OF THE INVENTION

Standard image capture systems such as photographic images are two-dimensional representations of the three-dimensional world. The process of transforming the three-dimensional real-world into the two-dimensional images is best represented through projective geometry. In particular, much of the information which is lost in the transformation is the distance between the camera and a point in the real-world. There have been a variety of methods which have the intent of retrieving or recording this type of information. Stereo images are a common example of such a process. Others, such as a scanner from Cyberware, Inc. scan a line of laser light across a scene and from variations in the reflected light estimate the range to the object. Another method pioneered at Sandia National Laboratories (see U.S. Pat. No. 4,935,616, to Scott) uses an amplitude modulated light source and a modulated image intensifier to effect destructive wave interference patterns. A series of images are taken by phase shifting either the illumination modulation or the image intensifier modulation. After the images are captured they are processed on a pixel-by-pixel basis to ascertain the range from the camera to the object for that pixel.

The method of image capture taught by Scott and subsequent methods employing Scott's design utilize a digital image capture system, such as a CCD, array. There are several reasons why this approach has been used. The first is that each image of the series has to be registered precisely in order for subsequent range analysis to be meaningful. A second reason is that because the images are to be digitally processed, having them captured in digital format is a direct processing path. In the preferred method of estimating the range as described by Scott is for two images to be captured, one with a destructive interference caused by modulating the image intensifier, and the other with the image intensifier set at a constant voltage. However, these prior art methods are disadvantaged in that image capture is in the digital format requiring large amounts of memory. In addition, spatial resolution in the captured images is limited with current digital systems, and the pixel bit depth is less than that of traditional image capture with photographic film.

SUMMARY OF THE INVENTION

It is therefore an object of the present invention to provide a range imaging method and system which utilizes photographic film for data storage.

It is a further object of the present invention to provide a range imaging method and system which allows for finer spatial resolution than current digital systems.

Still another object of the present invention to provide a range imaging method and system which does not rely on capturing at least one image with a destructive interference.

The foregoing and numerous other features, objects and advantages will become readily apparent upon review of the detailed description, claims and drawings set forth herein.

These features, objects and advantages are accomplished by providing a method and system for the capture and estimation of range information of the distance from the camera to objects in a scene for every pixel therein using photographic film as the image capture mechanism. A stable method is provided which uses a series of at least three images with each of the three images being acquired on photographic film from an identical location with the image intensifier of the camera being uniquely modulated for the capture of each image. The difference between the images is that the phase of the image intensifier modulation for each image is unique relative to modulation of the illuminator. If a series of n images are to be collected, then the usual arrangement is for successive images to have a phase shift of $$\frac{2\pi}{n}$$

from the phase shift of the previous image. However, this is not required. The only requirement is that each phase shift has to be unique. The range at a pixel location is estimated by selecting the intensity of the pixel at that location of each image and performing a best fit of a sine wave of one period through the points. The phase of the resulting best fitted sine wave is then used to estimate the range to the object based upon the wave length of the illumination frequency.

Photographic film is a traditional method of image capture and used in countless applications. As a method of recording images it is unparalleled for dynamic range, for resolution, and for efficiency is data storage. Conversion of photographic images into digital images has been possible for many years and has become common place. The PhotoCD system offered by Eastman Kodak Company is a method that maintains many of the advantages of photographic film as well as enabling the conveniences of digital image processing.

While the scanning of photographic film is readily done, the registration of a series of images for the purposes of range estimation is not assured. As a result, if a series of images are captured, and if the camera is stationary, it is not assured that the object at a selected pixel location will be identical in each image. It is not uncommon for the scanning variation to fluctuate up to 20 pixels with a standard Photographic Imaging Workstation. The variation comes from a number of sources, including variations in the film advance within the camera. This situation does not arise in digital image capture because the spatial variation that occurs in the scanning process is not present. As a result, there is a need in the practice of the present invention to provide a method to assure the precise registration of each image in the series of digitally scanned images from film. This is accomplished by providing the camera with means for writing fiducials on the film between the image areas.

Further, unlike a digital image capture method, film has to undergo a development phase. If there is any non-uniformity of the film development this will manifest itself as a noise source for the range estimation process. As a result there is a need for the images used to estimate range to be processed in a manner to minimize process variability.

DETAILED DESCRIPTION OF THE INVENTION

Figure 1:
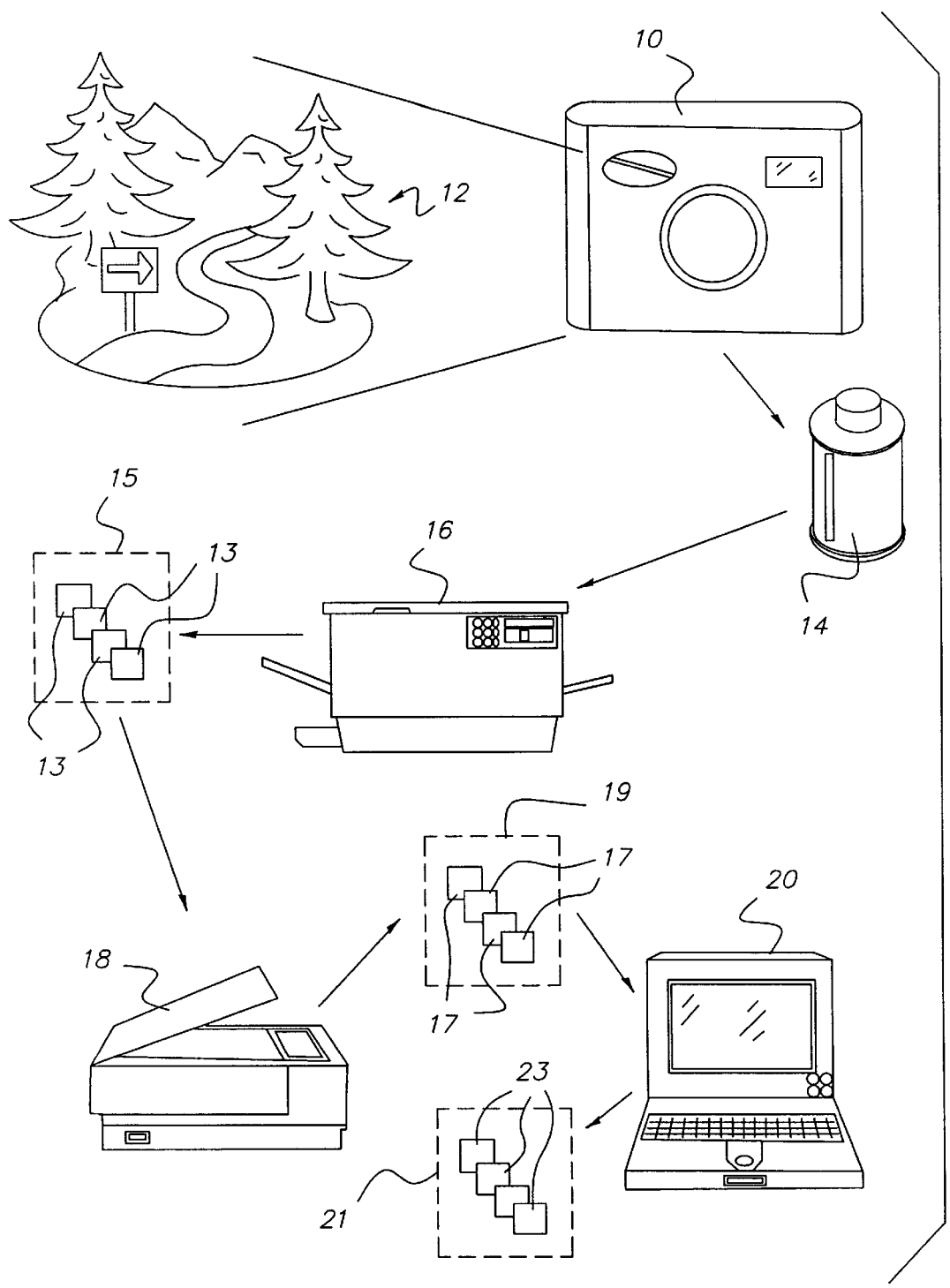
FIG. 1 is schematic diagram showing a system overview of the present invention including an image capture system or camera

Referring first to FIG. 1, there is shown a system overview including an image capture system or camera 10 which has the ability to emit modulated illumination and to synchronize a receiver with the same frequency, though which a locked phase offset. This system records the scene 12 as an image onto photographic film 14. The image capture system 10 captures a minimum of three images 13 (See FIG. 3) of the scene 12. Each image 13 of this plurality of images 13, referred to herein as an image bundle 15, is identical, with the exception that the phase offset for each image 13 in the image bundle 15 is unique. In addition, the system 10 puts fiducial markings (as will be described in greater detail with references to FIG. 4) on the film in order to assure image registration later in the range estimation process. The images 13 in the image bundle 15 are recorded on photographic film 14. While any photographic film 14 will work, it is preferred that a photographic film 14 such as EktaPlus 400® or EktaPlus 800® from Eastman Kodak Company is used. This will assure the overall speed of the image capture system 10, as well as having excellent material uniformity. The film 14 is then developed in a film development unit 16. Care needs to be taken in order to minimize process non-uniformities in the film development for successive film frames. The developed film images 13 are then scanned in a photographic imaging workstation (PIW) 18 (such as, for example the Kodak PCD Imaging Workstation 4220) and converted into a digital image bundle, with each image 13 being scanned using identical scanning characteristics. The PIW 18 often has a means to automatically apply image processing for improving the appearance of the image. However, in the practice of the present invention, if the PIW has this particular automatic processing feature, that feature of the PIW 18 must be disabled. The result is a plurality of digital images 17 which form a digital image bundle 19 which is then transferred to a image processing computer 20. The digital image bundle 19 is first registered by aligning the fiducial marks on each digital image 17. This is accomplished by a standard pattern matching algorithm. The preferred manner is to select one of the digital images 17 in the digital image bundle 19 and register all other images 17 to that image 17. Once the images 17 are all registered, a second digital image bundle 21 results with registered images 23. Information regarding the phase offsets of each image 17 and the modulation frequency of the illumination system of the camera 10 are given to the computer 20 and a range estimate for each registered pixel is performed. Details of the pattern matching algorithm and the range estimation algorithm are described below.

Figure 2:
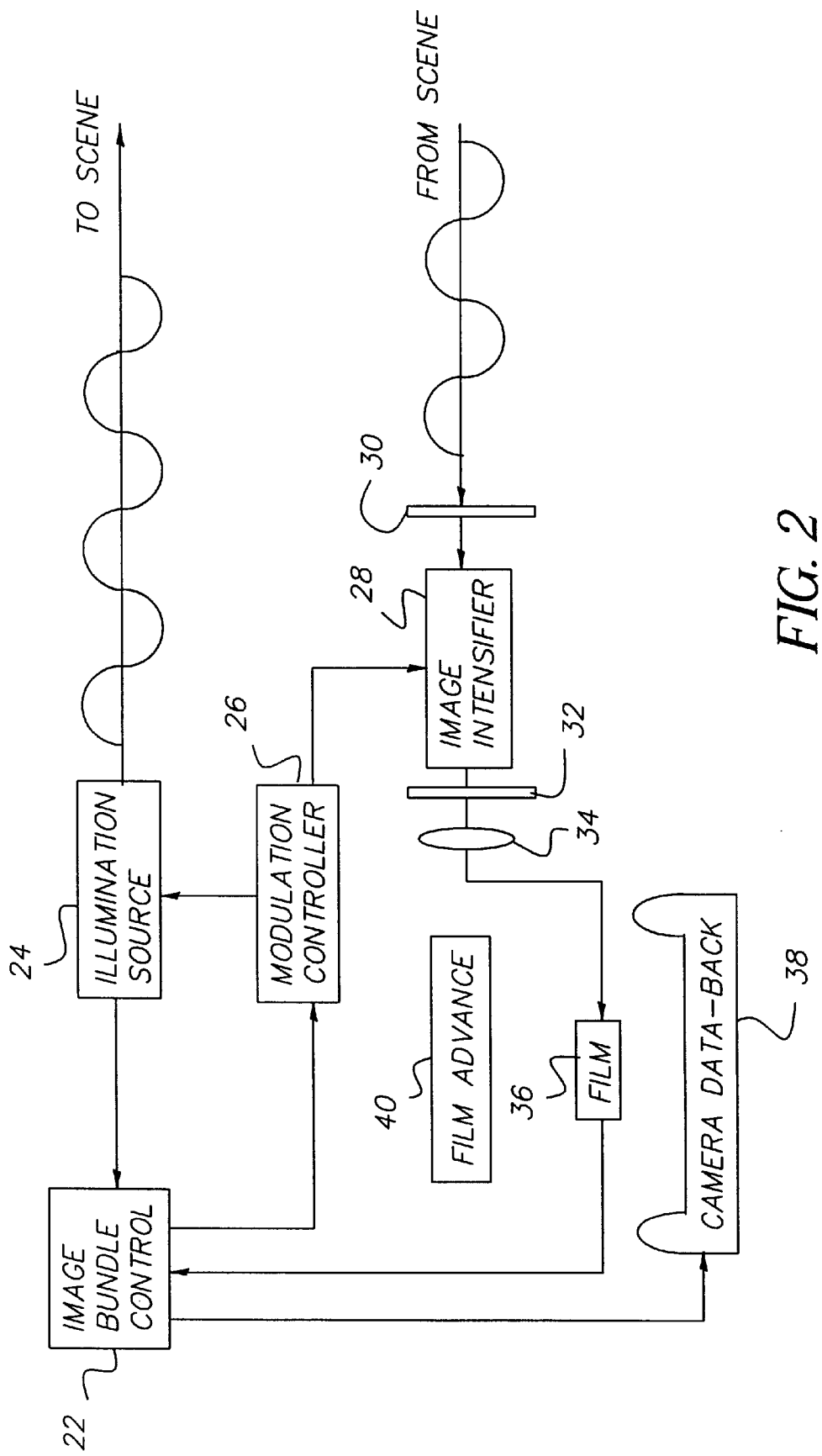
FIG. 2 is a block diagram of a camera which can be used in the practice of the range imaging system of the present invention.

Referring now to FIG. 2, there is shown a block diagram of the camera 10 which is comprised of a number of subassemblies in addition to the normal assemblies common to most cameras. In particular, the camera 10 has an image bundle control system 22 which manages the camera shutter (not shown), other standard camera functions, the average illumination level, the phase offset of the photo-intensifier and the modulator film advance, and the management of the camera data-back. An illumination source subassembly 24 can be modulated at sufficiently high frequency (e.g., 10 mHz) to attain sufficiently accurate range estimates. Typically, the illuminator of the illumination source subassembly 24 should be a laser device which has an optical diffuser in order to affect a wide-field illumination. The illumination does not have to be uniform. Preferably, the illuminator of the illumination source subassembly is modulatable at frequencies in the range of from about 5 to about 100 mHz and, most preferably in the range of from about 5 to about 50 mHz. A modulation controller 26 controls the modulation frequency of the illumination source 24 and of the image intensifier 28. Part of the function of the modulation controller 26 is to introduce the appropriate phase delay to the image intensifier 28. The light from the illumination source 24 is reflected and returns through a standard camera lens 30. The image intensifier 28 is a device which amplifies the returning light and acts as a modulating shutter. After passing through the image intensifier 28, the photons bombard a phosphor screen 32 which converts the energy into visible light. The visible light is then passed through an optional lens 34 in order to distribute the image across a frame 36 of photographic film. A camera data-back 38, such as a Nikon MF-28, is used to write a pattern between the image areas or frames of the photographic film. The pattern is used later to register the images. A film advance subsystem 40 is used to advance the film to successive frames with each frame within an image bundle having the same image recorded thereon.

Figure 3:
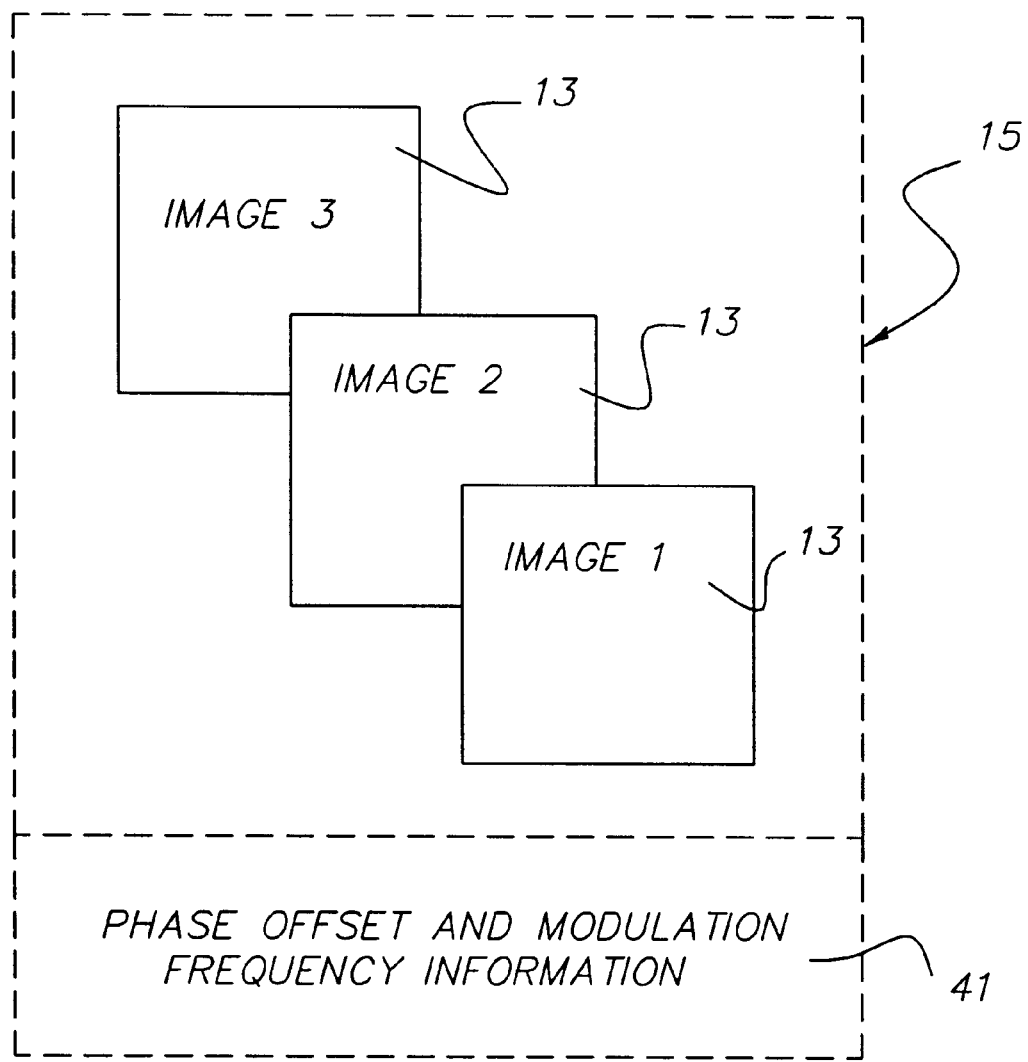
FIG. 3 is a schematic representation of an image bundle comprised of a plurality of images captured by the camera system.

Turning next to FIG. 3 there is schematically depicted an image bundle 15 comprised of a plurality of images 13 captured by the camera system 10 along with information (represented by box 41) about the each of the images 13. In the preferred embodiment there is a minimum of three images 13 in an image bundle 15 of a particular scene. Each image 13 contained in the image bundle 15 is captured with a unique phase offset in the camera system 10. The images 13 in the image bundle 15 are presumed not to have any other variation, such as camera motion or motion of objects within the scene. The information section 41 of the image bundle 15 minimally contains the phase offsets used for the images 13 in the image bundle 15 and the modulation frequency of the camera. It is presumed that the order of the information matches the order of the images 13 in the image bundle 15.

Figure 4:
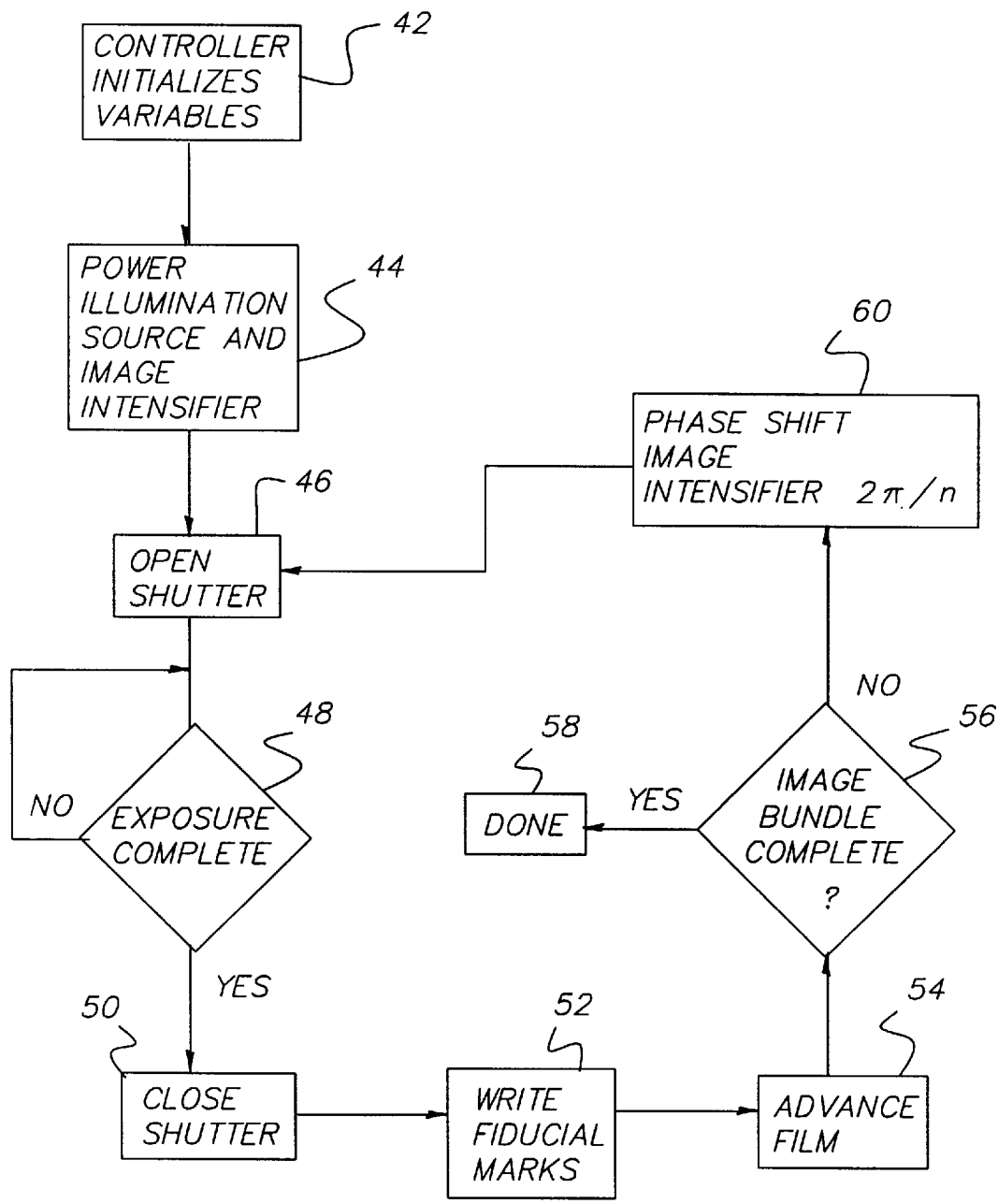
FIG. 4 is a logic flowchart of the operations required by the camera system.

Referring now to FIG. 4, there is depicted a flowchart of the operations required by the camera system 10 and controlled by the image bundle controller 22. As discussed above with reference to FIGS. 1 and 3, camera system 10 captures an image bundle 15, which consists of a plurality of images 13. Since each image 13 within the image bundle 15 has some special properties, the sequence of events must be managed. As a result the image bundle controller 22 must initialize (per function box 42) the initial phase offset of the modulation of the image intensifier 28, which preferably is set to zero. In addition, the number of images in the bundle is set, and the initial image index of the bundle is set to zero. The power is then supplied to illuminator of the illumination and image intensifier 28 per function box 44. These devices have better life expectancy if only powered when in use source subassembly 24. The camera shutter is then opened per function box 46. The camera shutter remains open for the appropriate exposure time of the film and for the image conditions per decision box 48. Exposure time is variable and controlled in a manner common to most advanced camera systems. When the exposure time period is complete, the shutter is closed per function box 50. The camera data-back 38 is then instructed to put the fiducial marks on the film. The image bundle controller 22 instructs the film advance subsystem 40 to advance to the film in preparation for the next image 13 in the image bundle 15, and increments the image index number for the image bundle 15 per function box 54. The system then determines whether all images in the image bundle are complete per decision box 56. If the answer is "yes" per function box 58, then the image intensifier 28 and the illumination source subsystem may be powered down. If the answer is "no", then (per function box 60) another image 13 is required and the phase offset for the image intensifier 28 has to be advanced $$\frac{2\pi}{n}$$

radians (where n=number of images 13 in the bundle 15), and the camera 10 is prepared to capture the next image 13 in the bundle 15. This process is continued until the image bundle controller 22 determines that a full image bundle 15 has been collected.

Figure 5:
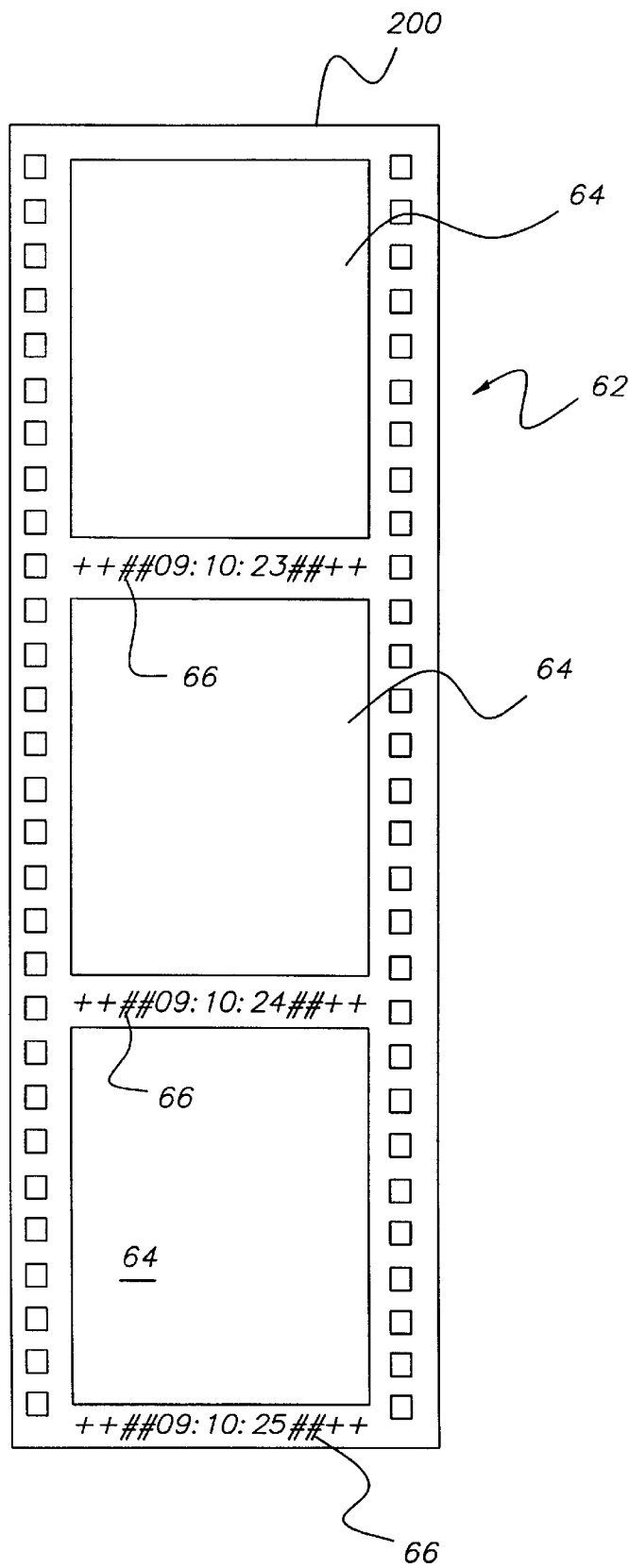
FIG. 5 is shown a plan view of a portion of photographic film.

Turning next to FIG. 5 there is shown a portion 62 of photographic film 14. As mentioned above, the film 14 contained in the camera 10 is used to capture the images on the image bundle. Captured in each of the film frames 64 are the successive images 12 of the image bundle. The camera data-back 38 writes fiducial marks 66 between the film frames 64. The fiducial marks 66 are written with a pattern of red LED's which typically have a distinct contrast to the remainder of the image. The fiducial marks 66 can be chosen to be any pattern of characters in the font of the camera data-back 38, though it is preferable to have characters with strong vertical and horizontal components such as "+" and "#". Other information, such as the time can be recorded in the pattern. It should be noted that the pattern primarily is used to align images for the range estimation process, and unique characters in successive patterns are not conducive to the primary benefit accrued from the pattern.

Figure 6:
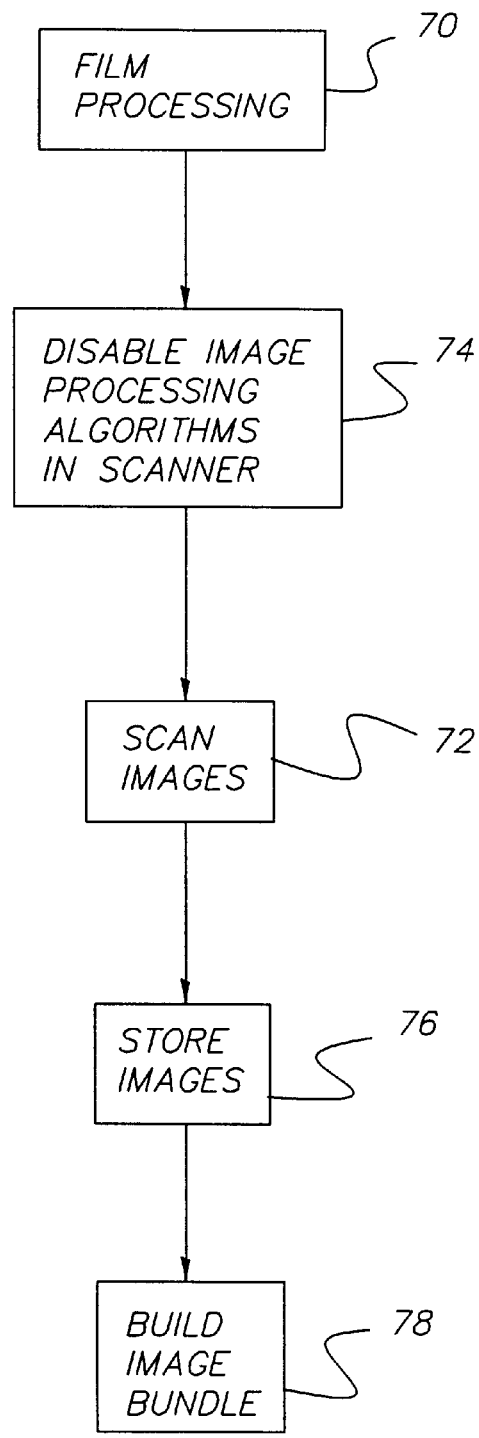
FIG. 6 is a block diagram of that portion of the process of the present invention which is preformed after an image bundle has been captured.

Looking next at FIG. 6 there is depicted a block diagram of that portion of the process of the present invention which is preformed after an image bundle 15 has been captured. The film 14 which was exposed as previously described now has to be developed (per function block 70) and scanned (per function block 72). The film developing unit 16 can be a standard film developer system, though caution should be taken to minimize the variation in film development variations within an image bundle 15. This should not be a major concern, since the images 13 are physically on the same film roll 14, and will be developed at the same time. The scanning step 72 is preferably performed with a Photographic Imaging Workstation (PIW) 18 (See FIG. 1). Such a PIW is available from Eastman Kodak Company and is used to process images for the PhotoCD product of Eastman Kodak Company and others. However, the PIW 18 typically has a number of internal image processing algorithms which analyze and modify an image in order to achieve an image which has preferable visual properties. Such image processing algorithms include an automatic scene balancing algorithm and a white point correction algorithm. Particulars of these algorithms are outside of the scope of this invention, and will not be described herein. Further, if these automatic capabilities are part of the PIW 18, then these algorithms need to be disabled (per function block 74) for the proper practice of this invention. It should be understood that the PIW 18 also does not have film alignment control within the tolerances of a single pixel. There are a number of sources of variation, including film advance variations, which are beyond the control of the PIW 18. However, the PIW 18 does need to scan the fiducial markings 66 written by the camera data-back 38. The scanned images are then stored per function block 76 with the associated phase and modulation data for each image from which an image bundle 15 is built per function block 78. The PIW 18 may return images in a variety of image formats, of which the Kodak PhotoCD format is one. The particular format is not critical, though knowledge of the format is necessary.

Figure 7:
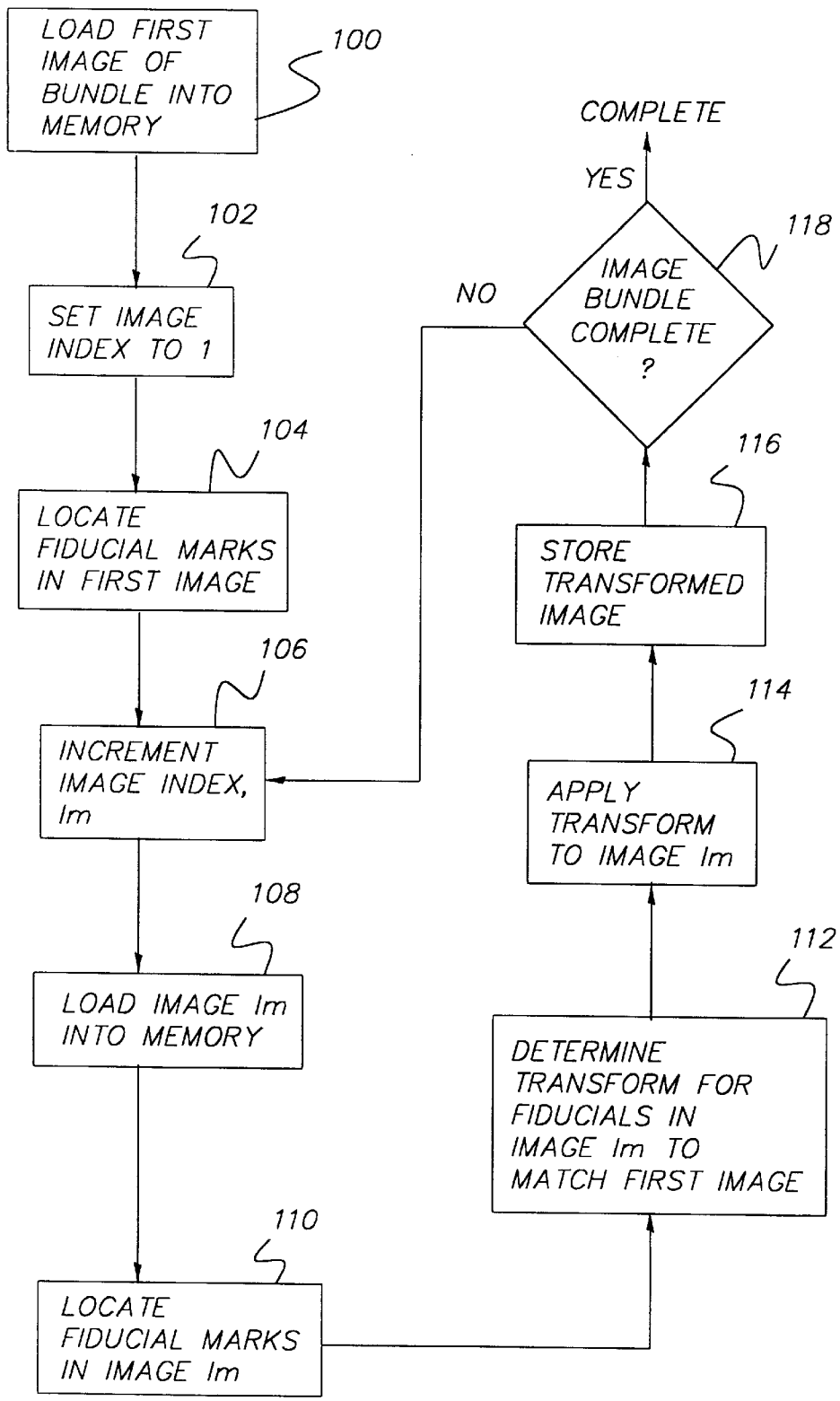
FIG. 7 there is a logic diagram showing a method for building an image bundle of registered images.

Referring now to FIG. 7 there is shown a logic diagram of a method to build an image bundle 21 of registered images 23. The images 13 in the image bundle 15 are scanned, but are not yet registered. In order to accomplish the registration the patterns written by the camera data-back 38 are used. All images 23 in the registered image bundle 21 use the first image 21 in the image bundle 23 as a reference. The first task (per function block 100) of the process is to load the first image 17 of a scanned image bundle 19 into the memory of the image-processing computer 20. The image index is then set to one per function block 102. Next, the fiducial marks 66 of the first image 17 are located (per function block 104) and the locations of these marks 66 are stored for future purposes. Since the fiducial pattern location is near the edge of an image 17, the search is conducted over that region. Since the fiducial marks 66 are a predominant color against a black background (the pattern is written on an otherwise unexposed portion of the film), the location of the fiducial pattern can ascertained with standard pattern matching algorithms. The image 17 is then stored as the first image 23 of the registered image bundle 21. The next task is to increment the image index per function block 106). Subsequently, the image matching the image index (that is, the next image in the bundle 19) is loaded into memory of the image-processing computer 20 per function block 108. The fiducial marks 66 in the loaded image 17 are then located using the same algorithm as used with the first image 17 per function block 1 10. The position of the fiducial marks 66 in the current image relative the position of the fiducial marks 66 in the first image determines an affine transform per function block 112. The transform 112 aligns the fiducial locations of the current image to the fiducial locations of the first image. Once the affine transform 112 is determined, it is applied to the entire image 17 (per function block 114) to form a new image 23 which is registered with the first image 23. The transformed (registered) image 23 is stored in the registered image bundle 21 per function block 116. Per decision box 116, the process then inquires as to whether all of the images 17 (all the indexed images) of the bundle 19 have been completely processed. If the answer is "yes", then the registered image bundle 21 is complete and the range estimation can occur. If the answer is "no," then the process returns to increment the image index per function block 106.

Figure 8:
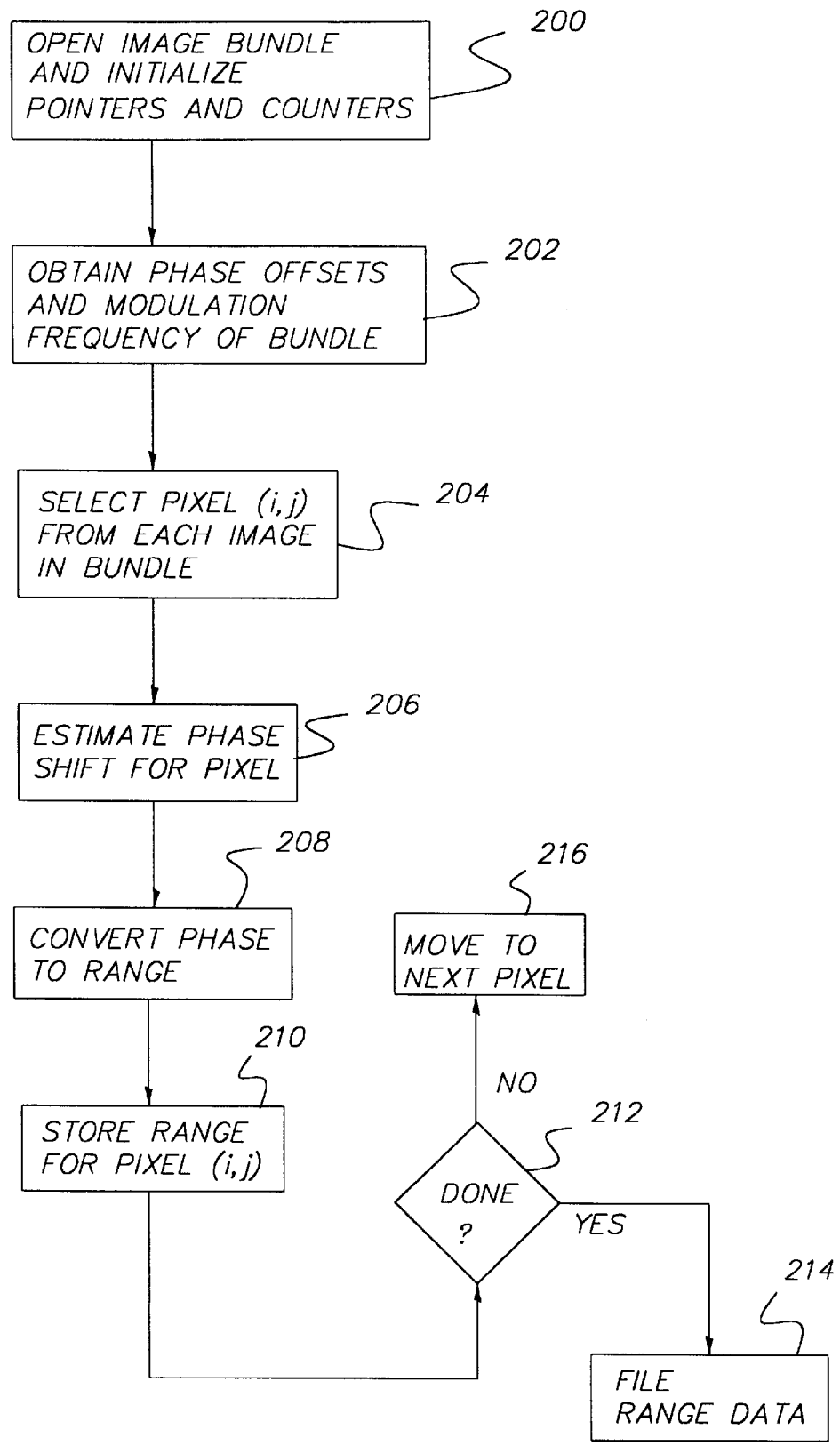
FIG. 8 is a logic diagram showing the method of estimating range from the registered images in the image bundle.

Referring now to FIG. 8, a logic diagram is presented showing the method of estimating range from the registered images 23 in the image bundle 21. The registered image bundle 21 is opened per function block 200 and pointers such as the image bundle index pointer and the pixel position pointer are initialized to the obvious values. A buffer is opened that will be used for local storage of the range values. It is preferable that the storage array assume the range estimates will be a floating point value. The buffer should also have the same number of data storage locations as there are pixels in each image 23 within the image bundle 23. For instance, the pixel position pointer is set to (0,0). From the image bundle 21 the phase offsets and modulation frequency are acquired per function block 202. The modulation frequency is converted into a phase to range conversion for later use. From each image 23 in the image bundle 21 the pixel at pixel location (i, j) is obtained per function block 204. Then, per function block 206, the phase shift for each pixel is estimated. The phase shift estimation method is described in detail below. The phase estimation is then converted to a range estimation per function block 208. Preferably, the range for a point in the initial image 23 of the image bundle 21 is computed by collecting a set of samples, one from each image 23 in the image bundle 2 1, as is the conversion of phase to range. For the present, consider a image capture system which has continuous response, i.e., analog, so the individual image intensity values are a scale factor and can for the moment be ignored. The illumination is modeled by:

$$\text{Illumination}(t) = \mu_{light} + \sigma_{light} \sin(t)$$

source is modeled by: where $\mu_{light}$ is the average illumination and $\sigma_{light}$ is the modulus of the illumination variation. Similarly, re response of the micro-channel plate is modeled by:

$$MCP(\varphi_{object}, \varphi_{shift}, t) = \text{Ambient} + \mu_{MCP} + \sigma_{MCP} \sin(t + w + \varphi_{shift}) \quad \text{Eq. 1}$$

where Ambient is the ambient light, $\mu_{MCP}$ is the mean response of the MCP, $\sigma_{MCP}$ is the modulus of the MCP response, w is the phase offset introduced by the distance to the imaged object, and $\varphi_{shift}$ is the phase shift introduced into the MCP modulation. The present analysis depends upon relative values of corresponding pixels. Thus, it can be seen that the response for a pixel is given by:

$$P(w) = \int_0^{2\pi} \text{Illumination}(t) MCP(\varphi_{object}, w, t) dt \quad \text{Eq. 2}$$

A simple calculation provides that:

$$P(w) = 2\pi \text{Ambient} \mu_{light} 2 \mu_{MCP} \mu_{light} \sigma_{MCP} \sigma_{light} \cos(\varphi_{object} + w) \quad \text{Eq. 3}$$

Which we simplify to:

$$P(w) = \lambda + \eta \cos(\varphi_{object} + w) \quad \text{Eq. 4}$$

It is desired to extract the phase term, w, from the expression. However, this term is not directly accessible from a single image. However, a set of three images captured with unique phase shifts is sufficient to determine w. For simplicity, consider the case where the phase shifts are given by:

$$\varphi_i = \frac{2\pi i}{3}; i = 0, 1, 2 \quad \text{Eq. 5}$$

Applying each pi the pixel response is given by:

$$P_i(w) = \lambda + \eta(\cos(w)\cos(\varphi_i) - \sin(w)\sin(\varphi_i)) \quad \text{Eq. 6}$$

By representing these equations as a matrix equation $$\begin{pmatrix} 1 \cos(\varphi_0) - \sin(\varphi_0) \\ 1 \cos(\varphi_1) - \sin(\varphi_1) \\ 1 \cos(\varphi_2) - \sin(\varphi_2) \end{pmatrix} \begin{pmatrix} \lambda \\ \eta \cos(w) \\ \eta \sin(w) \end{pmatrix} = \begin{pmatrix} P_0 \\ P_1 \\ P_2 \end{pmatrix} \quad \text{Eq. 7}$$

Let A be the matrix in the previous equation, and it is easy to see that A is invertible, as the determinant of the matrix is given by:

$$\text{Det}(A) = \sin(\phi_0 - \phi_2) - \sin(\phi_0 - \phi_1) + \sin(\phi_1 - \phi_2) \quad \text{Eq. 8}$$

so the vector containing all the phase information can be isolated, and denoted as a vector $\Phi$. The phase is then simply:

$$w = \tan^{-1}\left(\frac{\Phi_1}{\Phi_2}\right) \quad \text{Eq. 9}$$

Note that all constant terms are controlled by the camera design except the ambient light. However, as the analysis shows, the ambient light does not enter into the determination of the phase, but is contained in the parameter $\lambda$.

This analysis assumes that all quantities are known precisely and the system is noise-free. However, by adding additional images, with a corresponding number of phase offsets, the noise in the system can be reduced and the above analysis can proceed using a singular-value-decomposition in place of the matrix inversion. The conversion of phase to range is given by the simple equation:

$$\text{Range} = \frac{(\text{speed of light}) w / 2\pi}{2(\text{camera modulation})} \quad \text{Eq. 10}$$

The resulting range estimate is stored in the range estimate buffer previously opened per function block 210. Then, per decision box 212, there is an inquiry as to whether all pixels in the image bundle 21 have been processed. If the answer is "yes", then the range estimation buffer is stored to mass storage per function block 214. If the answer is "no", then the pixel location is incremented per function block 216 in order obtain the range estimate a subsequent pixel.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for image capture and estimation of range information comprising the steps of:

(a) capturing with an image capture device a plurality of identical images on photographic film to create an image bundle;

(b) performing said capturing step with a different phase offset for each image in the image bundle;

(c) placing at least two fiducial marks on the photographic film between adjacent images in the image bundle;

(d) developing the image bundle;
(e) scanning the image bundle;
(f) registering the images of the image bundle by aligning the fiducial marks; and
(g) estimating the distance from the image capture device to object(s) in the image bundle using the different phase offsets for each image.

2. A camera system for capturing image bundles for use with a range imaging system, each image bundle including at three images, said camera comprising:
   (a) a illumination source which is modulatable at frequencies in the range of from about 5 to about 50 mHz;
   (b) a modulation controller for controlling the modulation frequency of said light source and of an image intensifier;
   (c) a lens, light from said illumination source reflecting back from a scene to be captured as an image through said lens and said image intensifier;
   (d) a phosphor screen positioned behind said image intensifier;
   (e) a strip of photographic film containing a plurality of frames, said strip of photographic film contained with the camera system positioned behind said phosphor screen;
   (f) a film advance mechanism for advancing said strip of photographic film; and
   (g) a camera data-back for writing a pattern on said strip of photographic film between adjacent ones of said frames.

3. A method as recited in claim 1 wherein:
   said image bundle comprises at least three of said identical images.

4. A method as recited in claim 1 wherein:
   said performing step comprises controlling a modulation frequency of a light source.

5. A method as recited in claim 4 further comprising the step of:
   controlling a modulation frequency of an image intensifier.

6. A method as recited in claim 1 wherein:
   said placing step is performed by writing a pattern on the photographic film between adjacent ones of the plurality of identical images using a camera data-back.

\* \* \* \* \*